Jan. 19, 1960 J. H. ROTHENBERG 2,921,822
SELF CENTERING HIGH TEMPERATURE BEARING
Filed May 15, 1959

JEROME H. ROTHENBERG
INVENTOR.

BY Daniel H. Bobis
Atty

United States Patent Office 2,921,822
Patented Jan. 19, 1960

2,921,822

SELF CENTERING HIGH TEMPERATURE BEARING

Jerome H. Rothenberg, Colonia, N.J., assignor to Worthington Corporation, Harrison, N.J., a corporation of Delaware Application May 15, 1959, Serial No. 813,447

5 Claims. (Cl. 308—237)

This invention relates to improvements in means for mounting a sleeve bearing on a shaft, the improvements more particularly permitting differential thermal expansion to freely occur between these units while the desired operative relative positions of each are still maintained.

The material most suitable for the fabrication of shafts being a steel alloy and having a high coefficient of thermal expansion, while that suitable for the bearing or bearing sleeve mounted on the shaft being a carbide and having a low coefficient of thermal expansion, necessitates some provision in the mounting of the sleeve bearing on the shaft to allow for the relatively greater radially outward thermal expansion of the shaft as compared with that of the bearing sleeve. In addition, the bearing sleeve must be maintained in an exact concentric position about the shaft despite the referred to differential thermal expansion so as not to adversely affect the load carrying capacity of the bearing sleeve.

It is therefore one of the objects of the present invention to provide a sleeve bearing which is adapted to be mounted about the shaft in spaced relationship thereto, thereby providing an annular clearance space therebetween which permits unrestricted radially outward thermal expansion of the shaft.

A further object is the provision of means for mounting said bearing sleeve on the shaft in a manner which readily permits centering said shaft within the bearing sleeve prior to shaft operation, and which without further adjustment maintains this position of the shaft centrally of the bearing sleeve during shaft operation and despite radially outward thermal expansion of the shaft within the bearing sleeve.

To accomplish these and other objects, the section of the shaft on which the bearing is mounted, and which in most instances is an end section thereof, is made hollow and with an outer diameter just slightly less than the inner diameter of the bearing sleeve. Thus when the bearing sleeve is mounted on this shaft section there is an annular clearance space therebetween which permits unrestricted radially outward thermal expansion of the said shaft section. And to thusly mount the bearing sleeve in spaced relation to the shaft section, use is made of circumferentially spaced threaded bolts disposed through the sleeve bearing and shaft section to extend into the hollow interior of the shaft section, each of these bolts having disposed in sequence on its extended threaded end a cylindrical member slidably thereon, and a nut threadably adjustable thereon. Threadable adjustment of the nuts serves to draw up on the bolts and thereby enables centering of the shaft section within the bearing sleeve prior to shaft operation; and whereas the cylindrical members are purposefully made of a material having a coefficient of thermal expansion which is adapted to take up by thermal expansion the radially outward thermal expansion of the shaft section, these cylindrical members function to maintain the shaft section in a position centrally of the bearing sleeve during shaft operation despite the radially outward thermal expansion of the shaft section occurring during this time.

The invention will be better understood when considered in connection with the accompanying specification and drawings forming a part thereof, in which.

Figure 1:
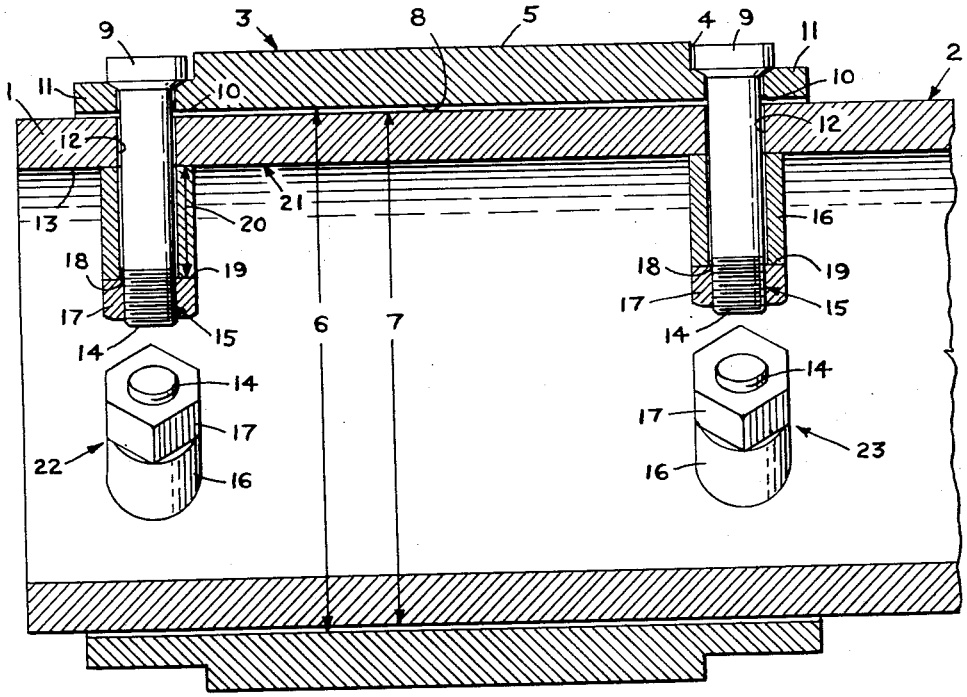
Figure 1 is a side view of a shaft having a sleeve bearing mounted thereon in accordance with the teachings of the present invention, in section taken on line 1—1 of Figure 2.
Figure 2:
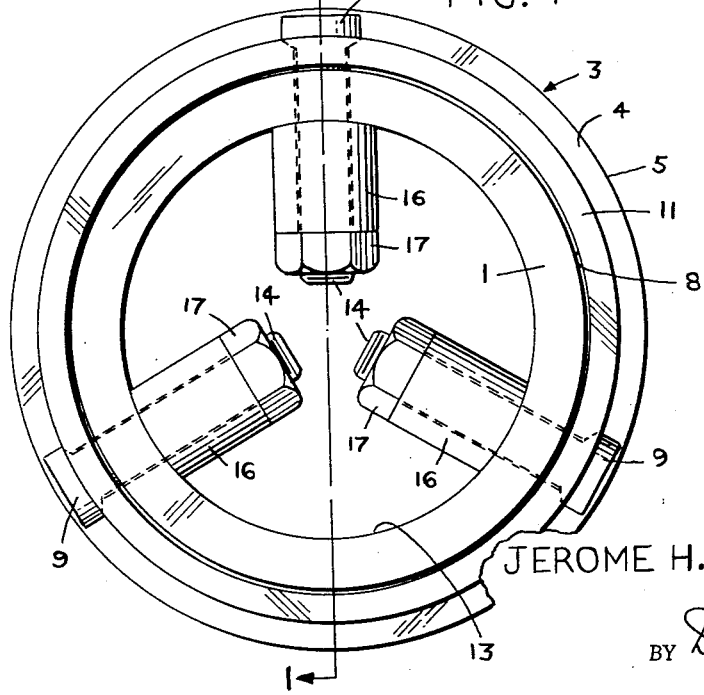
Figure 2 is an end view of the embodiment of the invention shown in Figure 1.

Referring to the drawings, reference numeral 1 designates a hollow end section of what will be understood to be an otherwise solid shaft 2, but may also be taken to designate the end section of a shaft hollow throughout its axial length and which nevertheless possesses sufficient structural strength to support a rotor (not shown) thereon. Mounted in spaced relation about this shaft section 1 is a bearing sleeve 3 having a raised annular portion 4 integrally formed thereon which presents an annular bearing surface 5. In comparative size, the inner diameter 6 of the bearing sleeve 3 is slightly larger than the outer diameter 7 of the shaft section 1, so that in the assembled condition illustrated in Figure 1, there is an annular clearance space 8 therebetween, into which space the shaft section 1 can freely expand in a radially outward direction under the influence of thermal forces.

More particularly, the clearance space 8 is provided to accommodate the relatively greater radially outward thermal expansion of the shaft section 1 as compared with that of the bearing sleeve 3, having due regard to the radically different materials of which these two members are made, and which have radically different propensities to expand under the influence of thermal forces. In the case of shaft 2, the material used is a steel alloy having a high coefficient of thermal expansion, whereas in the case of the bearing sleeve 3 the material used is a carbide having a relatively low coefficient of thermal expansion. Thus, the selection of materials for the shaft 2 and bearing sleeve 3, necessitates providing for differential thermal expansion of these members, and this is accomplished in the present invention by mounting the sleeve bearing 3 about the shaft section 1 with the said annular clearance space 8 therebetween.

In carrying out this novel mounting of the bearing sleeve 3 in spaced relation to the shaft section 1, use is made of circumferentially spaced bolts 9, each of which is disposed through circumferentially spaced openings 10 provided in the end sections 11 of the sleeve bearing 3 and through circumferentially spaced and aligned openings 12 provided in the shaft section 1 to extend into the hollow interior 13 of the shaft section 1. On each of the extended ends 14 of said bolts 9, which as clearly shown in the drawings are all threaded as at 15, there is disposed in sequence, a cylindrical member 16 slidable thereon, and a nut 17 threadably adjustable thereon. Selective tightening of the nuts 17 serves to draw up on the bolts 9 and thereby readily enables centering of the shaft section 1 within the bearing sleeve 3, it being contemplated that this adjustment in position of the shaft section 1 relative to the sleeve bearing 3 will be made prior to shaft operation and before there is any thermal expansion of the shaft section 1 under the influence of thermal forces.

Each cylindrical member 16 has an axial through bore 18 of a diameter larger than the diameter of each bolt 9 and is purposefully made of a material having a coefficient of thermal expansion which is adapted to result in thermal expansion of this member along the bolt to an extent necessary to take up the clearance which would otherwise exist after radially outward expansion of the shaft section 1. In other words, assuming that each bolt 9 is made of a material having a low coefficient of thermal expansion and thus the position of the face 19 on each said nut 17 as being fixed, as the shaft section 1 expands radially outward into the clearance space 8, the distance 20 between the nut face 19 and the inner surface 21 of the shaft section 1 will increase, thereby introducing the possibility of losing the relationship of exact concentricity initially provided between the sleeve bearing 3 and shaft section 1. However, since each cylindrical member 16 is composed of a material having a coefficient of thermal expansion which results in thermal expansion thereof along the bolt 9 to the extent necessary to take up the increment by which the said distance 20 increases, sleeve bearing 3 is maintained securely mounted about shaft section 1 in its position of exact concentricity relative thereto despite the radially outward thermal expansion of shaft section 1 occurring during shaft operation.

It has been calculated that efficient bearing operation and performance can be obtained over a temperature range of 70° F. to 1300° F. using the following combination of materials: for shaft 2, cobalt base alloy S816; for the bearing sleeve 3 and bolts 9, 12% cobalt cemented tungsten carbide; and for the cylindrical members 16, AISI type 316 stainless steel. It will be understood however that the invention is not to be limited solely to this combination of materials.

As herein illustrated, it is preferred to use the bolts 9 in two groups of three each, generally designated 22 and 23, and in which each bolt is spaced 120 degrees apart to thereby provide three point support for said bearing sleeve 3, but it will be understood that the number of these said groups and of the bolts used therein may be modified without departing from the invention as defined by the claims. Further, the bolts 9 need not be in the single plane as herein illustrated, but may be staggered along the axial length of the bearing sleeve 3.

In this respect, it will be understood that the invention is not to be limited to the specific construction or arrangement of parts shown, but that they may be widely modified within the invention defined by the claims.

What is claimed is:

1. In a shaft bearing, the combination of a shaft having a hollow shaft section, a bearing sleeve mounted in spaced relation about said hollow shaft section, and means for thusly mounting said bearing sleeve about said hollow shaft section comprising a plurality of circumferentially spaced threaded members disposed through said bearing sleeve and shaft section to extend into the interior of said shaft section, and disposed in sequence on said extended ends of said threaded members a first means slidably thereon and a second means threadably adjustable thereon, said second means being adapted by threadable adjustment to initially center said shaft section within said bearing sleeve, and said first means being of a select material adapted to take up by thermal expansion the radially outward thermal expansion of said shaft section during shaft operation to thereby maintain said shaft section in a position centrally of said bearing sleeve.

2. In a shaft bearing, the combination of a shaft having a hollow end section, a bearing sleeve of slightly larger diameter than said shaft end section, and means for mounting said bearing sleeve about said shaft end section in spaced relationship thereto to provide an annular clearance space therebetween permitting radially outward thermal expansion of said shaft end section, said means comprising a plurality of threaded bolts circumferentially spaced about each end of said bearing sleeve and disposed through aligned openings in said bearing sleeve and said shaft end section to extend into the hollow interior of said shaft end section, cylindrical members slidably disposed on each of said extended threaded ends of said bolts, and nut means threadably disposed on said bolts outwardly of said cylindrical members for drawing up on said bolts to center said shaft end section within said bearing sleeve prior to shaft operation, said cylindrical members being composed of a material having a coefficient of thermal expansion adapted to take up by thermal expansion the radially outward thermal expansion of said shaft end section during shaft operation to thereby maintain said shaft end section in a position centrally of said bearing sleeve.

3. In a shaft bearing, the combination of a shaft having a hollow end section, a sleeve having an external raised annular bearing surface thereon and an inner diameter slightly larger than the outer diameter of said hollow shaft end section, and means for mounting said sleeve about said shaft end section in spaced relationship thereto to provide an annular clearance space therebetween permitting radially outward thermal expansion of said shaft end section, said means comprising a plurality of threaded bolts circumferentially spaced about each end of said sleeve outwardly of said raised annular bearing surface and disposed through aligned circumferentially spaced openings in said sleeve and said shaft end section to extend into the hollow interior of said shaft end section, cylindrical members slidably disposed on each of said extended threaded ends of said bolts, and nut means threadably disposed on said bolts outwardly of said cylindrical members for drawing up on said bolts to center said shaft end section within said sleeve prior to shaft operation, said cylindrical members being composed of a material having a coefficient of thermal expansion adapted to take up by thermal expansion the radially outward thermal expansion of said shaft end section during shaft operation to thereby maintain said shaft end section in a position centrally of said sleeve.

4. The shaft bearing as claimed in claim 3 in which a set of three threaded bolts are circumferentially spaced about each end of said sleeve, the said bolts in each set being spaced 120 degrees apart from each other.

5. In a shaft bearing, the combination of a shaft having a hollow end section provided with circumferentially spaced openings in each end thereof, a sleeve having an external raised annular bearing surface thereon and provided with circumferentially spaced openings in each end thereof outwardly of said raised annular bearing surface adapted to align with the circumferentially spaced openings of said shaft end section, said sleeve having a slightly larger inner diameter than the outer diameter of said shaft end section to thereby provide when mounted thereon an annular clearance space therebetween permitting unrestricted radially outward thermal expansion of said shaft end section, and means for mounting said sleeve on said shaft end section comprising a plurality of threaded bolts each disposed through a pair of aligned openings in said sleeve and shaft end section to extend into the hollow interior of said shaft end section, a plurality of cylindrical members each slidably disposed on said extended threaded ends of said bolts, and nut means threadably disposed on said bolts outwardly of said cylindrical members for drawing up on said bolts to center said shaft end section within said sleeve prior to shaft operation, said cylindrical members being composed of a material having a coefficient of thermal expansion adapted to take up by thermal expansion the radially outward thermal expansion of said shaft end section during shaft operation to thereby maintain said shaft end section in a position centrally of said sleeve.

References Cited in the file of this patent

UNITED STATES PATENTS

| | | |
|---|---|---|
| 1,438,054 | Parsons | Dec. 5, 1922 |
| 2,590,761 | Edgar | Mar. 25, 1952 |